Feb. 12, 1952          H. H. PLATTS          2,585,168

COMPRESSOR CONTROL CIRCUIT

Filed Aug. 21, 1947                                3 Sheets-Sheet 1

HOWARD H. PLATTS
*INVENTOR.*

BY

HOWARD H. PLATTS
INVENTOR.

BY *Robert Meyer*
    *attorney*

Feb. 12, 1952          H. H. PLATTS          2,585,168
COMPRESSOR CONTROL CIRCUIT
Filed Aug. 21, 1947          3 Sheets-Sheet 3

HOWARD H. PLATTS
INVENTOR
BY

Patented Feb. 12, 1952

2,585,168

UNITED STATES PATENT OFFICE 2,585,168

COMPRESSOR CONTROL CIRCUIT

Howard H. Platts, Holyoke, Mass., assignor to Worthington Pump and Machinery Corporation, Harrison, N. J., a corporation of Delaware Application August 21, 1947, Serial No. 769,832

7 Claims. (Cl. 230—3)

This invention relates to engine driven portable compressor units and, in particular, refers to means for controlling the operation of the compressor and the engine in accordance with the air pressure in the storage tank.

In the common type of portable compressor unit, a compressor is driven by an internal combustion engine. It supplies air under pressure to a storage tank from whence the air is drawn for use. The air pressure within the tank varies in accordance with the demands of the devices being operated thereby varying the required output of the compressor and the required speed of the engine which drives the compressor.

The compressor control system must perform the duties of regulating the air pressure in the storage tank within narrow limits by loading and unloading the compressor and by regulating the speed of the engine. For best operation, it is desirable to control the speed of the engine so that it conforms to the required compressor output. There are a number of control circuits currently employed in the art for these purposes which, together with the present invention, are rather generally based on the same fundamental conception. Thus, they have a valve to operate the compressor unloading device and a second valve to regulate the speed of the engine. These valves are actuated by variations in pressure within the storage tank.

Within the broad limits just defined, there is much room for improvement in the compressor control circuits. From a practical standpoint, many of the circuits employed embody devices which are complex and expensive to manufacture and have controls which befuddle the working men who use the compressor unit. While the present invention uses a pilot valve and a compressor unloading valve which are old in the art, it completes the control circuit by the addition of novel devices which reduce the assembled cost of the circuit and which make the circuit very simple to adjust to working conditions.

From the standpoint of engineering, the circuits now used seem to embody one or more of the following disadvantages which are not found in a circuit according to the present invention, viz., (1) high fuel consumption, (2) stalling of the engine and, (3) chattering of the compressor suction valves.

The present invention reduces fuel consumption by means of a novel speed control device which, within a predetermined range of pressure, renders the engine speed proportional to the demand for pressure. This, of course, provides high fuel economy. Simple adjustments are provided so that the engine can be made to operate within its most efficient speed range.

Stalling of the engine is prevented by permitting the engine to accelerate before the compressor is loaded. This is accomplished by means of a check valve in the pressure line which actuates a relay valve to open or close the compressor unloading valves. The check valve has a bleed-off orifice which restricts the rate of pressure drop in the relay valve and thereby, delays its opening and, thus, the loading of the compressor.

Chattering of the suction valves is prevented by a novel relay valve. This valve has a large capacity and, in spite of the aforementioned delay feature, is arranged so that it provides rapid and generous applications or evacuations of pressure to and from the unloader valves. This permits rapid and positive action of the unloader valves so that the compressor suction valves are either fully operative or fully inoperative.

Other advantages and objects will appear in the accompanying detailed description of the preferred form of the invention as illustrated in the following drawings.

Figure 1:
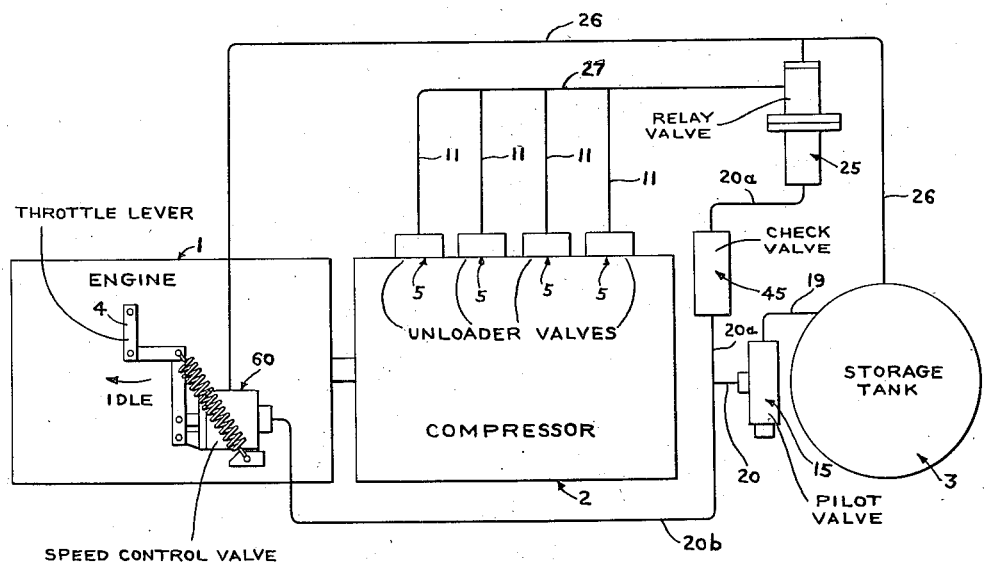
Figure 1 is a schematic diagram of the control circuit embodying the features of the invention.

The essential elements of a typical compressor unit are diagrammatically shown in Figure 1. An internal combustion engine 1 drives the compressor 2 which furnishes air under pressure to the storage tank 3. The speed of the engine 1 is controlled by means of a throttle lever 4 which is attached to a suitable carburetor or governor (not shown). Unloading of the compressor cylinders is accomplished by means of any suitable type of pressure actuated valves 5.

Figures 2, 3:
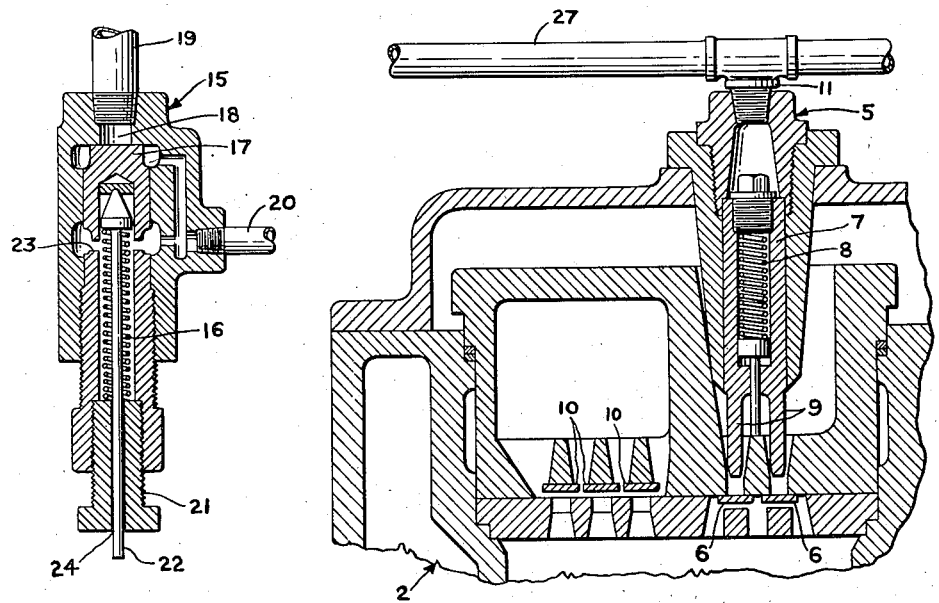
Figure 2 is a partial section of a compressor showing the structure of a suitable unloading valve.
Figure 3 is a longitudinal section through a suitable pilot valve.

A suitable unloader valve 5 of a well known type is shown in Figure 2. The valve 5 is associated with the suction valve strips 6 of the compressor cylinder and is arranged to hold these valves open when it is desired to unload the compressor. The slidable piston 7 is biased to an upward position by a spring 8 so that the fingers 9 thereon do not contact the strips 6. Under these conditions, a compression stroke in the cylinder will close the valves 6 and force air out through the discharge valves 10 which, of course, are connected by suitable means (not shown) to the tank 3. The conduits 11 communicate with the tops of pistons 7 so that air pressure therein tends to force the pistons downward. Tank pressure is carried by the conduits 11 and its presence in said conduits is regulated by a relay valve and a pilot valve, to be hereinafter described. Because of this regulation, tank pressure in lines 11 is always high enough to force the pistons 7 to have full strokes downward against the springs 8 so that the fingers 9 will hold the valve strips 6 wide open. With the valves 6 in this position air will flow by them on the compression stroke, thus unloading the compressor.

Another old device which is included in the control circuit of the present invention is the trigger or pilot valve 15 shown in Figure 3. This valve has a spring 16 which, at low pressure, forces the piston 17 upward to close off the inlet 18 which is connected by a conduit 19 to the tank 3. When the tank pressure reaches a sufficient amount, the spring resistance is overcome and the piston 17 snaps down to engage the seat 23 and air passes through the valve 15 into the outlet conduit 20. The tank pressure $P_o$ required to open the valve 15 is greater than the lowest pressure $P_c$ which will hold the valve open. In other words, pressure in the tank 3 must drop from $P_o$ to $P_c$ before the valve 15 will close. The specific values of these pressures depend upon the initial compression of spring 16. This may be varied by means of the threaded back-up 21. The pin 22 which transmits spring forces to the piston 17 is loosely carried by the back-up 21. Thus, when the piston 17 does not engage the seat 23, air may flow from conduit 20 down around the pin 22 to atmosphere through the opening 24.

In some prior art circuits the unloader valves 5 have been connected directly to the outlet line 20 of the pilot or trigger valve 15. These circuits have been somewhat unreliable and unsatisfactory due, possibly, to the restricted flow passage through the valve 15. Because of this, the circuit of the present invention uses the valve 15 as a pilot to control the flow of air through a relay valve 25 of much greater capacity. The relay valve 25 receives pressure directly from the tank 3 by means of a conduit 26 and transmits this tank pressure directly to the unloader valves 5 by means of the outlet conduit 27 and the conduits 11. These units are designed so that whenever tank pressure is admitted to the unloader valves, it is sufficiently high to fully open the valves 6. This arrangement prevents chatter of the valve strips and has been found to overcome other difficulties encountered when the valve 15 was connected directly to the unloader valves.

Figure 4:
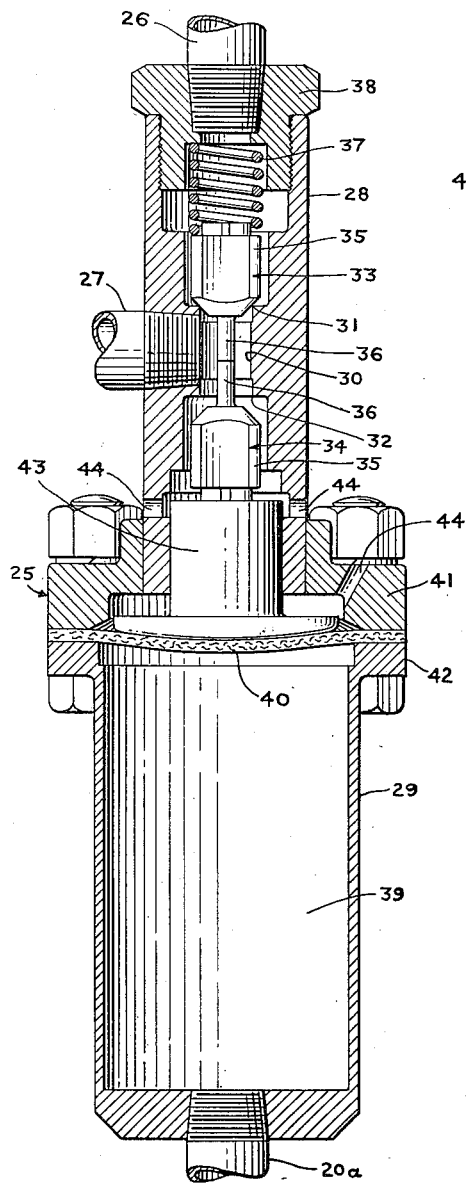
Figure 4 is a longitudinal section through a relay valve according to the present invention.

As shown in Figure 4, the relay 25 has upper and lower body sections 28 and 29. Air for the unloader valves 5 flows only through the upper body section 28. This section has a cylindrical valve chamber 30 with opposed valve seats 31 and 32 at each end. Identical valves 33 and 34 are arranged to seat on the seats 31 and 32. These valves have fluted heads 35 so that air can flow by them when they are not seated. The valves 33 and 34 have abutting stems 36, the combined length of which is slightly greater than the length of the chamber 30. As a consequence, only one of the valves can be seated at a time and, in particular, when the valve 34 is seated the valve 33 is unseated.

Pressure from the tank 3 in the conduit 26 is admitted to the top of the upper valve 33. This, of course, tends to seat the valve and prevent flow of air through the body 28. The valve 33 is also biased to a closed position by a spring 37 which bears on its head 35 and on the bottom of the cover 38 of the body 28. These two forces tending to seat the valve 33 must be overcome before air can flow out of the valve through the outlet line 27 which communicates with the chamber 30 and with the unloader valves 5.

The pressure in the line 20a from the pilot valve 15 is used to unseat the valve 33 and thus permit flow through the body section 28. The line 20a is connected to a chamber 39 in the lower body section 29. A diaphragm 40 is tightly held between the mating flanges 41 and 42 of the upper and lower body sections 28 and 29 and seals the chamber 39 from the interior of the body 28. A slidable plunger 43 is suitably connected to the diaphragm 40 so that it moves therewith. The valve 34 is fixedly connected to the upper end of the plunger 43 unless the valve 25 is to be used in the vertical position shown in which case the force of gravity will provide an operative connection between the valve 34 and the plunger 35. In any event the valve 34, the plunger 43, and the diaphragm 40 are operatively connected to each other so that they move toegther as a unit. The diaphragm 40 has an area exposed to pressure of the line 20a which is considerably greater than the area on top of valve 33 which is exposed to pressure in line 26. Thus, whenever pressure is admitted to the chamber 39 through the pilot valve 15 and conduit 20a, the upward force on the diaphragm 40 will be greater than the downward forces on the valve 33. Then the valve 34 will move upward to seat itself and to unseat the valve 33 and permit passage of air from the tank 3 through the relay valve 25 to actuate the unloading valves 5. In view of the foregoing it is apparent that unloading occurs whenever pressure reaches the chamber 39.

When the valve 33 is seated, pressure trapped in the valves 5 lines 11 and 27, and chamber 30, passes by valve 34 and to atmosphere through the vents 44 in the body 28.

Figure 5:
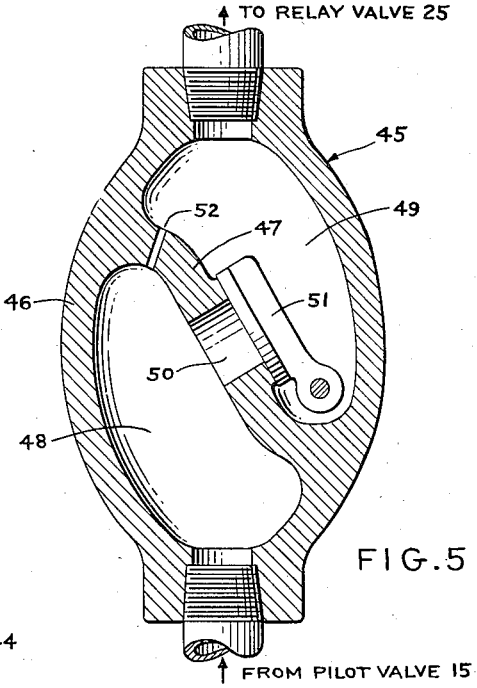
Figure 5 is a longitudinal section through a suitable check valve embodying a bleed-off orifice.

The check valve 45 of Figure 5 is included in the line 20a between the pilot valve 15 and the chamber 39 in order to prevent free back flow of air from the chamber 39 to the pilot valve 15 and thence to atmosphere through opening 24. This valve is of a common type which has a housing 46 with a partition 47 therein dividing it into two chambers 48 and 49. Chamber 48 is connected to the pilot valve 15 and chamber 49 to the chamber 39 in the relay valve 25. The partition 47 has an opening 50 which connects the two chambers. A flap valve 51 is hinged in the chamber 49 so that free flow is permitted in the direction of relay valve 25 but reverse flow of air toward the pilot valve 15 forces the flap valve 51 to close the opening 50. The special feature of this check valve is the orifice 52 in the partition 47 which permits a restricted back flow from the chamber 39 to the opening 24 in the pilot valve 15. The size of the orifice 52 obviously controls the rate of such back flow.

The effect of restricted back flow in line 20a is to delay the response of the unloader valves 5 to a demand for more pressure in tank 3. When the pressure in tank 3 reaches $P_o$, it opens the pilot valve 15 and pressure reaches the chamber 39 to open the relay valve 25. This permits the tank pressure to reach the unloader valves 5 where it forces the pistons 7 downward to hold the valves 6 open and unload the compressor. When the pressure in the tank 3 falls below $P_c$, the pilot valve piston 17 moves up to connect check valve chamber 48 to the opening 24 in the pilot valve and thus to atmosphere. Pressure in chamber 48, therefore, drops to atmospheric. In the meantime, however, the flap valve 51 prevents a back flow from check valve chamber 49 so that the rate of pressure drop in relay valve chamber 39 is dependent on the size of the orifice 52. As a consequence, the valve 33 is held off its seat for a brief period after the pilot valve 15 closes or after the pressure has dropped in tank 3 below $P_c$. This keeps tank pressure on the unloader valves 5 and holds the valves 6 open for said brief period until air in chamber 39 has an opportunity to escape through orifice 52. In this way loading of the compressor 2 lags behind the closing of valve 15 by a time interval that is dependent upon the rate at which pressure in chamber 39 is released through the orifice 52. As shown, unloading of the compressor occurs instantaneously upon the opening of the pilot valve 15.

The other part of the circuit, which regulates the engine speed, is arranged so that the engine responds immediately to opening or closing of the pilot valve 15. The engine speed decreases as pressure in the tank rises from $P_c$ to $P_o$ and when the pilot valve 15 opens at $P_o$ the engine is slowed down to idling speed. The main structural element of the engine circuit is a novel speed control valve 60. This valve may be considered as being in effect, two valves, viz., (1) a valve 60a which actuates the engine throttle 4 and which is itself actuated by direct pressure from tank 3 in conduit 26 and, (2) a valve 60b which actuates the valve 60a to idle the engine when pressure reaches it from pilot valve 15 through the connecting conduit 20b.

Figure 7:
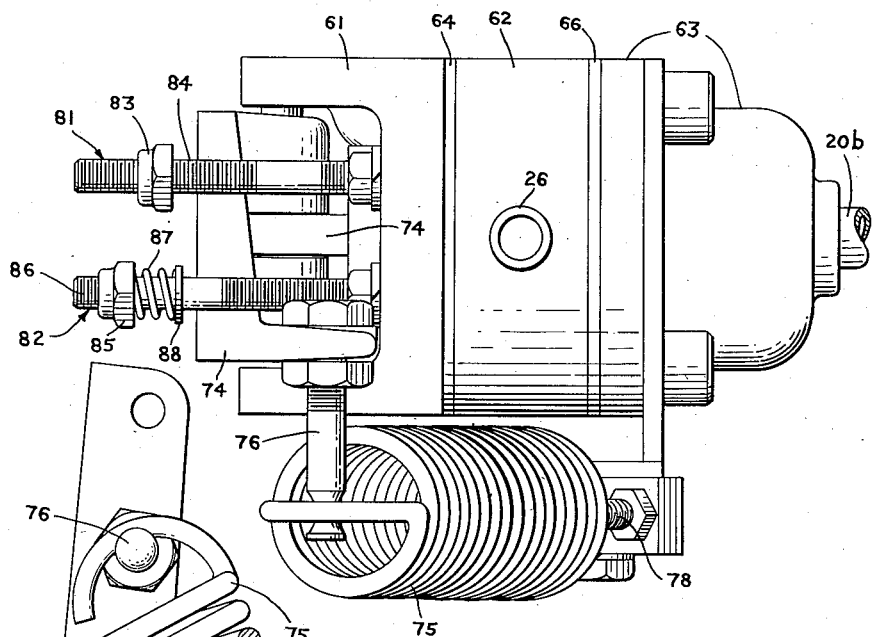
Figure 7 is a plan view of the novel speed control valve.
Figure 6:
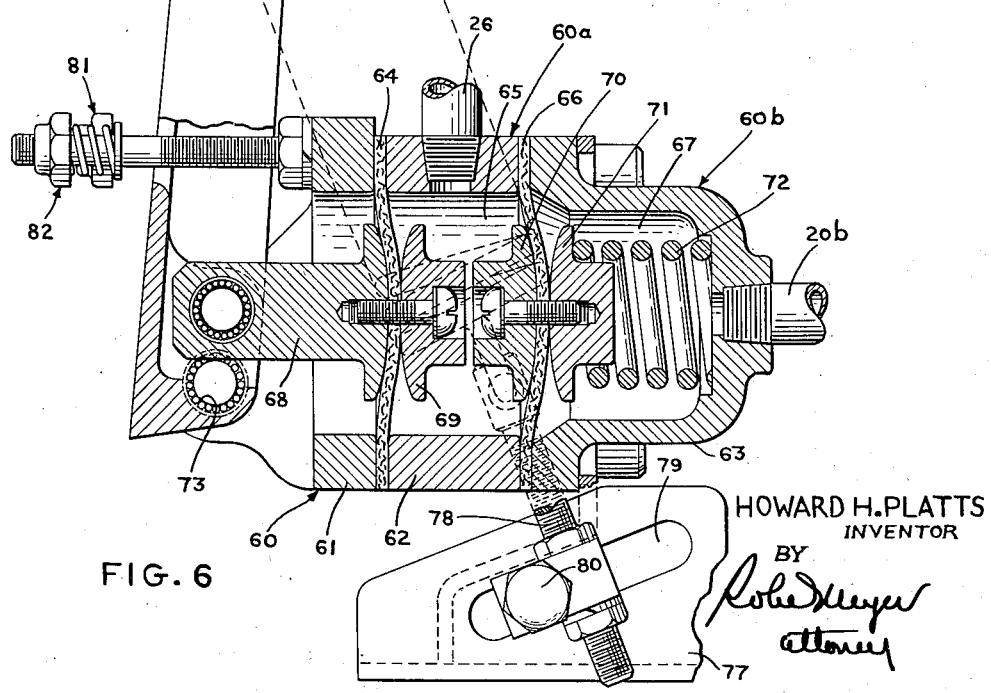
Figure 6 is a longitudinal section through the novel speed control valve.

As shown in Figures 6 and 7, the speed control valve 60 has a three piece housing made up of a cover and bracket 61, an annular body 62, and a bell-shaped housing 63. The cover 61 and the body 62 are suitably connected together and include between them the outer periphery of a diaphragm 64 which thus seals off the left end of the chamber 65 within the body 62. The body 62 and the housing 63 are likewise suitably connected together and also include between them the outer periphery of another diaphragm 66 which seals off the right end of the chamber 65 and the left end of the chamber 67 within the housing 63. Two plungers 68 and 69 are connected to the diaphragm 64, the plunger 69 being in the chamber 65 and the plunger 68 extending through the cover 61. The diaphragm 66 also has two plungers 70 and 71 connected to it, the plunger 70 being in chamber 65 and the plunger 71 being in chamber 67. The diaphragm 66 is yieldably biased to the left by a spring 72 which bears upon the plunger 71 and upon the inner end wall of the housing 63. A lever 74 is pivoted at 73 to the cover 61. The lever 74 is also pivotally connected to the plunger 68 so that movements of the latter with diaphragm 64 will pivot the lever 74 about the point 73 as a fulcrum. The top of the lever 74 is connected by suitable linkage to the throttle 4 of the engine 1 so that movement of the lever 74 to the left slows down the engine 1 and movement to the right speeds up the engine.

The diaphragm 64 is yieldably biased to the right or full speed position by the spring 75. This spring is connected to a pin 76 near the top of the lever 74 and to a bracket 77 at the bottom of valve housing. The common type of stud and nut arrangement 78, for adjusting the initial tension of the spring 75, is threaded into a lock clamp 80 by means of which the spring is locked in position in a slot 79 in the bracket 77. As clearly indicated in Figure 6, varying the position of the spring 75 in the slot 79 changes the moment arm of the spring with respect to the point 73 about which the lever 74 is pivoted. This, in effect, varies the spring rate.

Two adjustable stops 81 and 82 are attached to the cover 61. Stop 81 limits the leftward movement of the lever 74 and thus determines the idling speed of the engine. Stop 82 is actually a cushion which absorbs the thrust of the lever 74 and steadies it during operation of the engine. The stop 81 consists simply of a nut 83 on the stud 84 which is fixed to the cover 61 as shown in Figure 7. The stop 82 comprises a nut 85 on a stud 86 which is parallel to the stud 84. The nut 85 backs up a buffer spring 87 and a washer 88 mounted on the stud 86. The lever 74 has suitable shoulders to bear against the nut 83 and the washer 88. The nut 83 is obviously adjusted to the desired idling position of the lever 74. The stop 81 is, therefore, positive and prevents further leftward movement of the lever 74 which would tend to decrease the engine speed. In the stop 82, the length of the spring 87 and the position of the nut 85 are selected so that the washer 88 contacts the lever 74 at least when the pilot valve 15 opens. The spring 87 cushions the lever as it moves into abutment with the stop 81.

The parts to the left of the diaphragm 66 (except plunger 70) may be considered as comprising the valve 60a. This valve controls the engine speed so that it is inversely proportional to the pressure in tank 3. Pressure from tank 3 is led directly into the chamber 65 by means of the conduit 26. This pressure acting on diaphragm 64 moves the lever 74 to the left against the resistance of the spring 75. The initial pressure in tank 3 required to move the lever 74 from the full speed position is dependent on the initial setting of the spring 75 and may be varied by means of the stud and nut arrangement 78. If tank pressure increases above this initial value, the consequent leftward movement of the lever 74 is proportional to the increase. Thus, the decrease in engine speed is proportional to the increase in pressure in the tank 3. Preferably, the size of the chamber 65 and the diaphragm 64, the properties of spring 75, and the linkage connecting the lever 74 to the throttle 4 are selected so that when the pressure reaches $P_o$ the engine speed will have decreased from full speed to about one-half speed. The pressure range corresponding to this range of engine speeds can be varied by varying the rate of spring 75. Thus, moving the spring 75 in slot 79 away from the lever pivot 13 increases the moment arm and the spring rate and, therefore, increases the range of pressure increase in tank 3 which is required to decrease engine speed from full to one-half.

The diaphragm 66, its plunger 70, and the parts to the right thereof in Figure 6 may be considered as comprising the valve 60b. This valve supplies sufficient force to push the lever 74 against stop 81 to idle the engine 1. The chamber 67 is connected to the pilot valve 15 by means of the conduit 20b so that when the pilot valve is open, substantial tank pressure is within the chamber. This places both sides of the diaphragm 66 under tank pressure. The pressure forces substantially nullify each other and the spring 72 forces the diaphragm 66 to the left, toward the lever. When this occurs, the plunger 70 contacts the plunger 69 to transmit the force of spring 72 to the diaphragm 64. This force plus that of tank pressure acting on diaphragm 64 are sufficient to snap the lever 74 to the left against the stops 81 and 82. In this way, when tank pressure reaches $P_o$, the pilot valve 15 will open and pass pressure to the valve 60b which will instantaneously drop the engine speed from one-half to idling speed. When tank pressure falls to $P_c$, the pilot valve 15 will close and connect the chamber 67 to the opening 24 or to atmosphere. Tank pressure on the left side of the diaphragm 66 will overcome the resistance of spring 72 and force it to the right. Plunger 70 will then be carried away from plunger 69 and the lever 74 will have an equilibrium position which is dependent upon the value of the force of spring 75 and the force of tank pressure on diaphragm 64. This response also occurs instantaneously upon the closing of the valve 15.

As has just been shown, when the pilot valve 15 closes due to a demand for pressure, the engine immediately accelerates. In view of the previously described delay in the opening of the unloader valves 5 when the pilot valve closes, the engine will not be under a load during this period of acceleration. This permits it to reach a sufficient speed so that when the compressor load is applied there will be no starving of the engine and consequent stalling.

By way of a brief summary, the operation of the entire regulating circuit will be described. Before the circuit is put into practical operation certain simple adjustments must be made. The first of these is to regulate the compression of the spring 16 in the pilot valve 15 so that the compressor 2 will be unloaded and the engine 1 will be idled when the pressure in tank 3 exceeds a desired $P_o$. The second is to adjust the idling stops 81 and 82 to the proper engine speed. A third adjustment is to regulate the tension of spring 75 so that the engine speed will start to decrease at a desired pressure which, preferably, is around $P_c$. The fourth adjustment is to regulate the rate of spring 75 so that when the pressure rises from $P_c$ to $P_o$, the engine speed will drop the desired amount, preferably to about half speed.

When there is no pressure in tank 3, the pilot valve 15 is closed, the relay valve 25 is closed so that the compressor is loaded, and in valve 60 the pressure of spring 75 overcomes that of spring 72 so that the lever 74 is in its limiting position to the right to run the engine at high speed. As pressure builds up in tank 3 and chamber 65, the force on diaphragm 66 pushes it to the right so that valve 60b becomes inoperative. When tank pressure reaches a sufficient value to overcome the initial setting of spring 75, the lever 74 begins to move leftward and the engine speed becomes inversely proportional to the pressure in tank 3. If air is continuously taken out of tank 3 to run pneumatic tools or the like, the engine speed will fluctuate in accordance with the load.

When the pressure in tank 3 is allowed to exceed $P_o$ or the initial setting of the spring 16 in pilot valve 15, this valve opens. Pressure immediately reaches the relay valve 25 through line 20a and the idling valve 60b through line 20b. The relay valve 25 opens to admit tank pressure in lines 26 and 27 to the unloader valves 5. This unloads the compressor 2. At the same time, the pressure in chamber 67 of valve 60b permits the spring 72 and the tank pressure in chamber 65 of valve 60a to force the lever 74 against the stop 81 to idle the engine.

Before the pilot valve 15 closes again, tank pressure must drop to some value $P_c$ which is determined by the relative areas of the piston 17 and the inlet 18. When the valve 15 closes, the chamber 67 in valve 60b is immediately evacuated. The force of spring 72 is overcome by pressure in chamber 65 and the lever 74 moves to the right to accelerate the engine to a speed which depends upon the value of the pressure in the tank 3 and the chamber 65. At the same time the check valve 45 in line 20a closes so that the relay valve 25 cannot close and load the compressor. The pressure in chamber 39 which holds the relay valve 25 open is gradually bled out through the orifice 52 in the check valve 45. After a brief delay, the pressure in chamber 39 finally drops to a point where the relay valve 25 closes and the compressor 2 is loaded. In the meantime, however, the engine has accelerated to a speed at which it can handle the compressor load without stalling.

Figure 8:
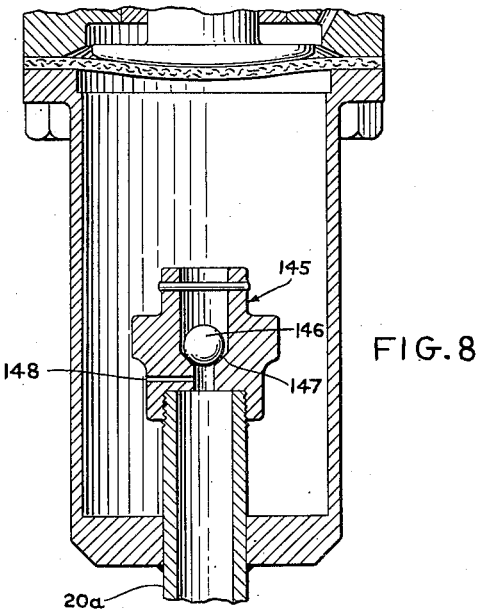
Figure 8 is a partial longitudinal section of the relay valve in combination with a modified form of check valve.

Figure 8 illustrates a modified form of that feature of the invention which provides a delay in reloading the compressor. In this form a conventional ball check valve 145 is connected to the conduit 20a which leads from the pilot valve 15 to the chamber 39 of the relay valve 25. As shown in Figure 8, the end of the conduit 20a and the attached ball check valve 145 are within the chamber 39 so that their exteriors are subject to the pressure in the chamber. The ball 146 is lifted off its seat 147 when pressure flows into the chamber 39. When the pilot valve 15 closes and the line 20a is connected to atmosphere, the pressure attempting to escape from chamber 39 forces the ball 146 on its seat 147 to block flow to atmosphere. In order to provide a slow bleed off of fluid from the chamber 39, an orifice 148 is drilled in the valve 145 or the conduit 20a between the seat 148 and the bottom of the chamber 39. Pressure in chamber 39 is, therefore, permitted to drop at a predetermined rate and delay reloading of the compressor in accordance with the mechanism described above in connection ith check valve 45.

In application where the speed control valve 60 does not provide sufficient force to move the lever 4, a booster mechanism such as shown in my copending application Number 769,833, filed Aug. 21, 1947, may be used.

It is to be understood that the invention is not to be limited to the specific construction or arrangement of parts shown and that they may be modified within the limits of the claims.

What is claimed is:

1. A regulating circuit for the engine of a portable compressing unit having a compressor and a storage tank including, a pilot valve having an inlet and an outlet and subject to the fluid pressure in said tank arranged to open and permit passage of fluid therethrough when said pressure exceeds a predetermined maximum and to close when said pressure drops to a predetermined minimum, means for controlling the speed of said engine so that it is inversely proportional to said pressure at least when said pressure is within the range between said maximum and minimum and for idling said engine when said pressure exceeds said maximum comprising a speed control valve having a housing, a pair of spaced diaphragms in said housing forming a first chamber between said diaphragms and a second chamber between one of said diaphragms and a wall of said housing, means connected to the other of said diaphragms and connected to said engine to decrease the speed thereof when said diaphragm moves to increase the volume of said first chamber, said first chamber having an inlet connected to said storage tank to receive tank pressure therein, spring means connected to said one diaphragm so as to yieldably bias it to decrease the volume of said first chamber when the pressure in said first chamber is substantially equal to the pressure in said second chamber, means operatively connecting said one diaphragm to the other diaphragm so as to move the latter when the former is moved by said spring means, and said second chamber having an inlet connected to said pilot valve outlet.

2. A control circuit for a fluid compressing unit having an engine, a compressor, and a storage tank comprising pressure responsive unloader valves for said compressor, a first conduit connecting the unloader valves to said storage tank, a relay valve in said conduit for controlling the passage of fluid therethrough, pressure actuated means connected to said relay valve to control the opening and closing of said relay valve, a speed control having a first pressure responsive means therein connected to said engine and said storage tank actuated by pressure from said storage tank for controlling the speed of said engine from full acceleration down to a predetermined minimum speed, a second pressure responsive means in said speed control adjacent said first pressure responsive means therein and provided with a projection thereon adapted to abut said first pressure responsive means within said speed control when said second pressure responsive means is actuated to throttle the engine from said predetermined minimum speed down to idling, controlling means connected to said storage tank and actuated by a maximum tank pressure to actuate said pressure actuated means and said second pressure responsive means and by a minimum tank pressure to vent said unloader valves and second pressure responsive means to atmosphere, and an orifice and check valve means between said pressure actuated means and said controlling means for delaying the closing of said relay valve.

3. A control circuit for a fluid compressing unit having an engine, a compressor, and a storage tank comprising pressure responsive unloader valves for said compressor, a first conduit connecting the unloader valves to said storage tank, a relay valve in said conduit for controlling the passage of fluid therethrough, pressure actuated means connected to said relay valve to control the opening and closing of said relay valve, a speed control having a first pressure responsive means therein connected to said engine and said storage tank actuated by pressure from said storage tank for controlling the speed of said engine from full acceleration down to a predetermined minimum speed, a second pressure responsive means in said speed control adjacent said first pressure responsive means therein and provided with a projection thereon adapted to abut said first pressure responsive means within said speed control when said second pressure responsive means is actuated to throttle the engine from said predetermined minimum speed down to idling, a pilot valve having an inlet and an outlet thereon, said inlet connected to the storage tank and said outlet connected to said pressure actuated means and said second pressure responsive means whereby a maximum tank pressure will actuate said pressure actuated means and said second pressure responsive means, said pilot valve open to atmosphere when the tank pressure drops to a minimum to allow said pressure actuated means and said second responsive means to vent to atmosphere, said relay valve having a first orifice thereon to allow said unloader valves to vent to atmosphere when it is closed, and a second orifice and check valve means provided between said pressure actuated means and said pilot valve outlet for delaying the closing of said relay valve.

4. A control circuit for a fluid compressing unit having an engine, a compressor, and a storage tank for storing compressed fluid comprising, a pilot valve having an inlet and an outlet thereon, said inlet communicating with said storage tank to allow a predetermined maximum tank pressure to open said pilot valve and a predetermined minimum pressure to close said pilot valve, unloader valves on said compressor, a first conduit connecting said unloader valves to the storage tank, a relay valve in said first conduit, said relay valve including pressure actuated means for opening and closing said valve to control and block fluid passage through said first conduit, a speed control having a first pressure responsive means therein connected to said engine and said storage tank and actuated by pressure from said storage tank for controlling the speed of said engine from full acceleration down to a predetermined minimum speed, a second pressure responsive means in said speed control adjacent said first responsive means therein and provided with a projection thereon adapted to abut said first pressure responsive means within said speed control when said second pressure responsive means is actuated to throttle the engine from said predetermined minimum speed down to idling, a second conduit means connecting the pressure actuated means and the second pressure responsive means to said pilot valve outlet whereby when said storage tank reaches the predetermined maximum pressure the pressure actuated means and the second pressure responsive means will be actuated and when said storage tank reaches the predetermined minimum causing the pilot valve to close the pressure actuated means and the second pressure responsive means will be vented through said pilot valve to atmosphere, said relay valve being normally open to maintain said unloader valves vented to atmosphere, and an orifice and check valve means in said second conduit between said pressure actuated means and said pilot valve to delay the closing of said relay valve for providing a predetermined rate of venting of said unloader valve.

5. In an unloading circuit for a fluid compressing unit having an engine, a compressor and a storage tank for storing compressed fluid, unloading valves for said compressor, a conduit connecting said valves to the storage tank, a pilot valve having an inlet and an outlet thereon, said inlet communicating with said storage tank to allow said pilot valve to open and permit passage of fluid therethrough when the pressure in said tank exceeds a predetermined maximum and to close when the pressure drops to a predetermined minimum, means in said conduit adapted to permit fluid flow therethrough when said pilot valve is open comprising, a relay valve having a first and a second chamber therein, said first chamber provided with an inlet connected to said storage tank and an outlet connected to said unloader valves, an upper and a lower valve slidably mounted in the same axial line on either side of said outlet in the first chamber and provided with abutting stems on the opposed faces thereof whereby when one is closed the other will be held open by the abutting stems, said upper valve yieldably biased to block fluid flow from said inlet to said outlet in the first chamber, a diaphragm separating said first chamber from said second chamber, a plunger member slidably mounted in said first chamber to operatively connect said diaphragm to said lower valve, said second chamber connected to said pilot valve outlet to receive tank pressure therein when said pilot valve is open so that said diaphragm will operate to move the plunger member and cause the lower valve to unseat said upper valve and to seat itself to permit flow of fluid from said inlet to said outlet in said first chamber, an orifice in said first chamber below said lower valve to allow said unloader valves to bleed to atmosphere when said lower valve is unseated, and means for delaying the lowering of said lower valve.

6. In an unloading circuit for a fluid compressor as claimed in claim 5 wherein said means for delaying the closing of said lower valve includes a check valve between said pilot valve outlet and said second chamber adapted to close when said pilot valve closes, and an orifice to bleed fluid from said second chamber to atmosphere at a predetermined rate when said check valve closes.

7. A control circuit for a fluid compressor having an engine, a storage tank for storing compressed fluid, and a compressor comprising, unloading valves for said compressor, a conduit connecting said valves to the storage tank, a pilot valve having an inlet and an outlet adapted to be opened when the pressure in said storage tank reaches a predetermined maximum and to close when the pressure in said tank reaches a predetermined minimum, means in said conduit adapted to permit fluid flow therethrough only when said pilot valve is open comprising a relay valve having a first and a second chamber therein, said first chamber having an inlet thereon connected to said storage tank and an outlet thereon connected to said unloader valves, a pair of opposed valves slidably mounted in said first chamber, abutting stems on each of said valves whereby when one is closed the other will be held open by the abutting stems, said second chamber being separated from said first chamber by an air tight diaphragm at the upper end thereof, the lower end of said second chamber being connected to the pilot valve outlet to allow tank pressure to act on and move said diaphragm when the pilot valve is open, and means operatively connecting said diaphragm to at least one of said opposed valves so that when the diaphragm is moved it will seat said valve and unseat the other of said valves to control fluid flow through said first chamber, and means for controlling the speed of said engine so that it is inversely proportional to tank pressure at least when said tank pressure is within the range between said maximum and said minimum and for idling said engine when tank pressure exceeds said maximum comprising a speed control valve having a housing, a pair of spaced diaphragms in said housing forming a first chamber between said diaphragms and a second chamber between one of said diaphragms and a wall of said housing, lever means connected to the other of said diaphragms and connected to said engine to decrease the speed thereof when said other diaphragm moves to increase the volume of said first chamber, said first chamber on said speed control having an inlet connected to said storage tank to allow tank pressure to act in said first chamber, spring means connected to said diaphragm forming said second chamber to yieldably bias it to decrease the volume of said first chamber in the speed control valve when the pressure in said first chamber is substantially equal to the pressure in said second chamber, means operatively connecting said diaphragms to each other within said speed control housing to allow movement of the diaphragm forming said second chamber to move the other diaphrgam, and said second chamber in said speed control having an inlet connected to said pilot valve outlet to allow pressure from said tank to act therein when said pilot valve is open.

HOWARD H. PLATTS.

REFERENCES CITED

The following references are of record in the file of this patent:

UNITED STATES PATENTS

| Number | Name | Date |
|---|---|---|
| 1,145,043 | Treiber, et al. | July 6, 1915 |
| 1,180,214 | Wainwright et al. | Apr. 18, 1916 |
| 1,834,592 | Sanford | Dec. 1, 1931 |
| 1,855,696 | Stover | Apr. 26, 1932 |
| 1,864,132 | Halleck | June 21, 1932 |
| 2,134,693 | Bartholomew | Nov. 1, 1938 |
| 2,211,875 | Aikman | Aug. 20, 1940 |
| 2,212,631 | Baker | Aug. 27, 1940 |
| 2,225,854 | Baker | Dec. 24, 1940 |
| 2,227,668 | Parker | Jan. 7, 1941 |
| 2,294,410 | Lamberton | Sept. 1, 1942 |
| 2,380,226 | Frantz | July 10, 1945 |
| 2,381,429 | Bell, et al. | Aug. 7, 1945 |
| 2,410,824 | Lamberton | Nov. 12, 1946 |
| 2,421,872 | Evelyn | June 10, 1947 |

FOREIGN PATENTS

| Number | Country | Date |
|---|---|---|
| 529,417 | Germany | 1931 |
| 537,220 | France | Feb. 27, 1922 |